Figure 1:
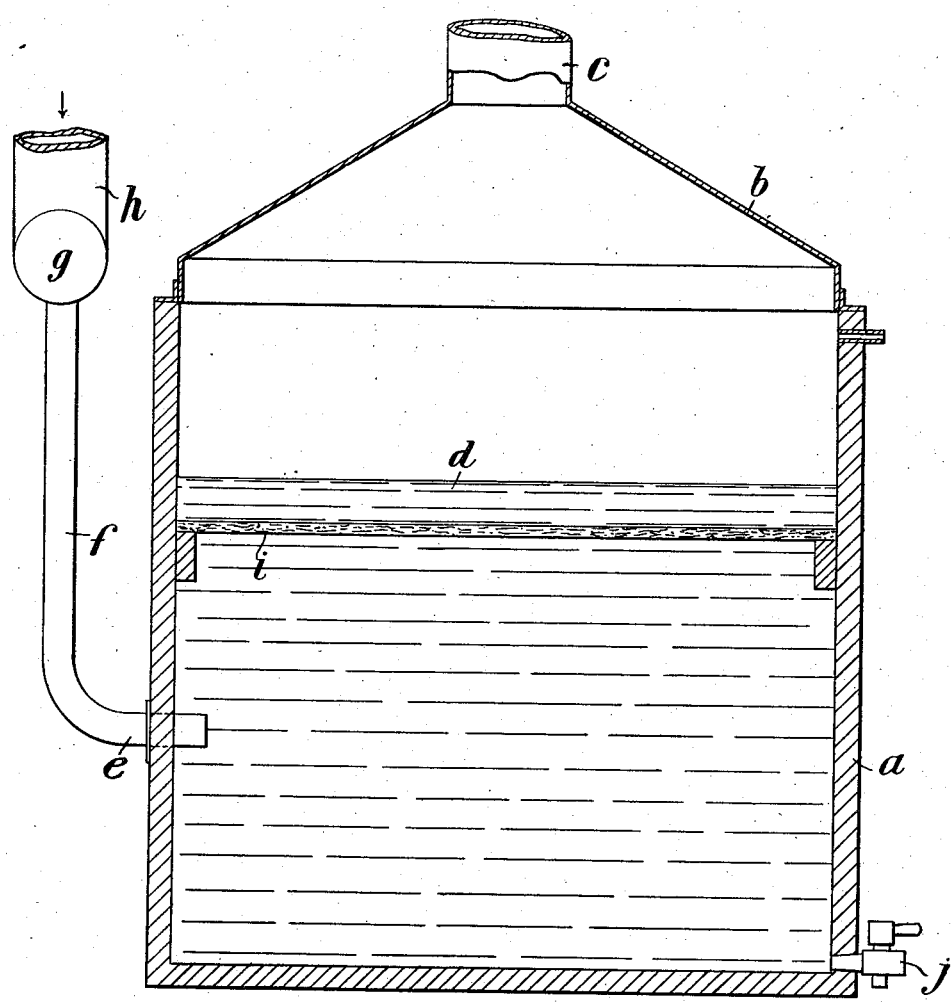

R. F. PEARCE.
COLLECTION OF FUME, FLUE DUST, AND OTHER MATTER SUSPENDED IN GAS.
APPLICATION FILED JULY 29, 1911.

1,028,487.

Patented June 4, 1912.

2 SHEETS—SHEET 1.

Witnesses.

Inventor.
Richard Francis Pearce

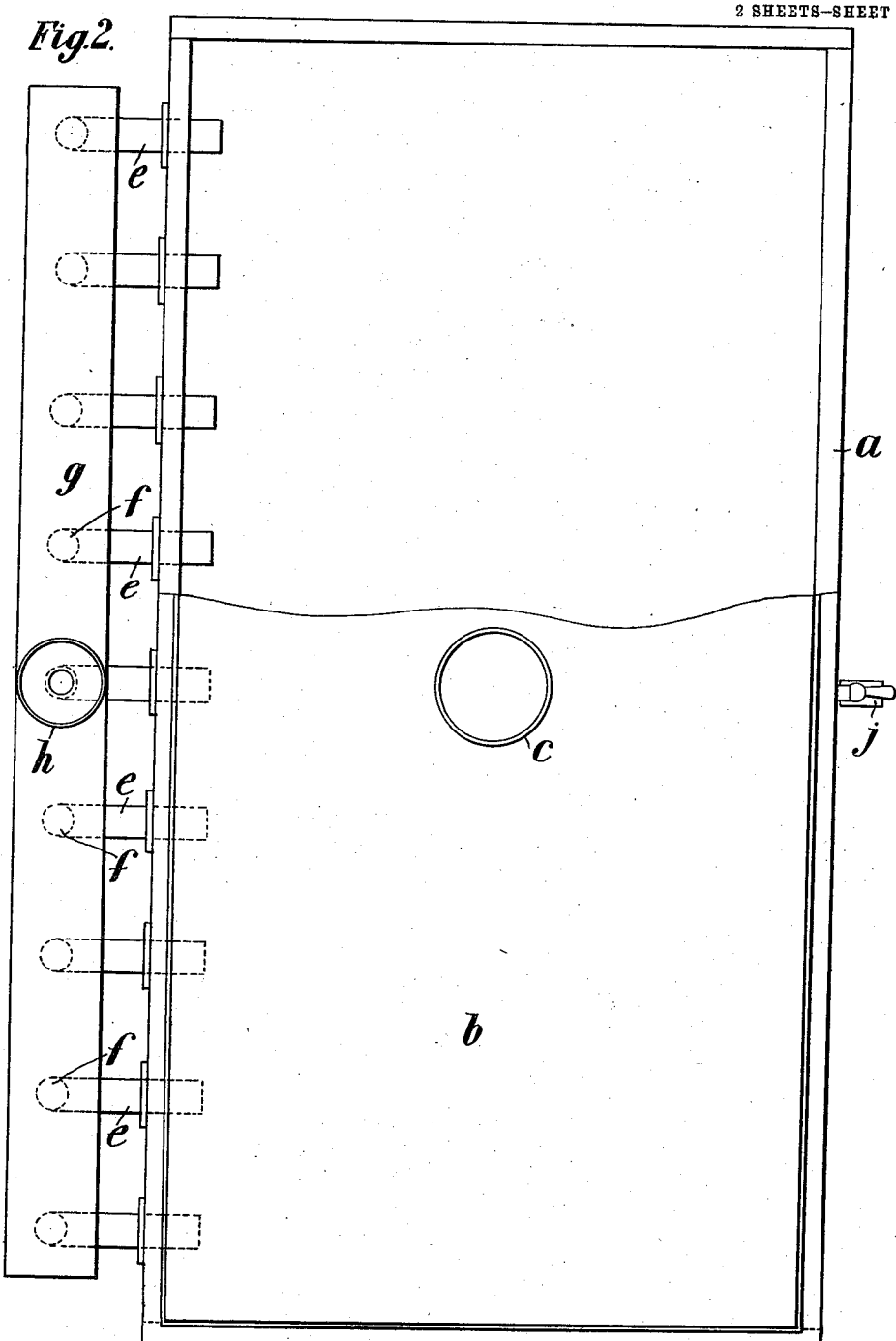

UNITED STATES PATENT OFFICE.

RICHARD FRANCIS PEARCE, OF LIVERPOOL, ENGLAND.

COLLECTION OF FUME, FLUE-DUST, AND OTHER MATTER SUSPENDED IN GAS.

1,028,487. Specification of Letters Patent. Patented June 4, 1912.

Application filed July 29, 1911. Serial No. 641,368.

*To all whom it may concern:*

Be it known that I, RICHARD FRANCIS PEARCE, a citizen of the United States of America, residing at 9 Beach Lawn, Waterloo, Liverpool, in the county of Lancaster, England, have invented new and useful Improvements in the Collection of Fume, Flue-Dust, and other Matter Suspended in Gas, of which the following is a specification.

My invention relates to improvements in apparatus for the collection of fume, flue dust and other matter, carried in suspension in gases of the kind in which the gas carrying the fume, flue dust or the like, is introduced into a tank or other receptacle containing water, the said gas being introduced below the level of the water and a suitable filter being provided in the tank between the gas inlet and the water level.

In apparatus of this kind as hitherto constructed it has been proposed to introduce the gas into the tank through perforated pipes the said pipes extending across the tank and through which pipes the gas had to pass before entering the water, whereby they were subjected to the action of the hot gas, so that in the case of gases carrying fumes in suspension, such as lead or tin oxid, the fumes would accumulate in the said pipes which in a very short time would become so filled with deposit of fume as to render the operation of the apparatus extremely difficult.

Now, according to my invention I provide for the gas being introduced into the tank through tubes which pass through the wall of the tank or container below the level of the liquid and the filter and project only a short distance into the tank, whereby the gas is immediately cooled to the temperature of the water, and the blocking of the tubes by the formation of condensed fume is prevented. The gas thus distributed on its entrance into the tank below the water level, rises up through the water and the filter, and in its passage is freed from the fume or the like which it contains, the said fume being left in suspension in the water and ultimately settling in the bottom of the tank, while the clean gas passes out through an outlet conveniently arranged above the water level in the tank.

A further improvement consists in the provision of a filtering medium composed of a layer or layers of material of fibrous texture such as cocoa-nut fiber in the form of matting, or asbestos cloth, arranged on a wooden platform. The employment of a filter screen of such material effectually frees the gas from its contained fume and the filtering screen itself is proof against the attacks arising from the acid condition of the water.

In carrying out my invention I proceed as follows, that is to say, I provide a tank of any convenient shape, rectangular, for example, the said tank being filled with water to any desired level. The gas to be cleansed is introduced into the said tank and below the water level, preferably laterally by means of one or several tubes which pass through the wall of the tank and project only a short distance therein and into which tubes the said gas is passed under pressure.

The tank is provided between the inlet pipes and the level of the water column with a filtering medium such as cocoa-nut fiber in the form of matting or asbestos cloth through the interstices of which the gas passes. The gas which, as above stated, is introduced under pressure issues into the tank and percolates up through the column of water above the inlet pipes, and through the filter and in its passage is freed of the contained fume, flue dust, or the like. On attaining the level of the water the cleansed gas collects in the upper part of the tank, whence it issues through an outlet preferably formed in the dome or hopper of the tank and is conveyed to any convenient collector or receptacle.

To enable the invention to be fully understood, I will describe it by reference to the accompanying drawing, in which:—

Figure 1 is a sectional elevation of a suitable form of apparatus for carrying out the invention. Fig. 2 is a plan view thereof with a portion of the top or cover of the tank removed.

*a* represents the tank, which in the example shown is of rectangular shape, although the shape may be varied to suit particular requirements as above stated.

*b* is the hopper top of the said tank having the outlet *c* at its apex. The interior of the tank *a* is filled with water to a convenient level such as that indicated at *d*, Fig. 1.

*e, e* are the tubes which enter the tank *a* at one side thereof, and at the part outside the tank extend upward as shown at *f*, and are in communication at their upper ends with a common horizontal supply-pipe g having an inlet h.

i is the filtering medium, which, as above described is of cocoa-nut fiber in the form of matting or asbestos cloth, and which is arranged between the inlet pipes e, e and the upper level d of the water in the tank a.

With this construction of apparatus it will be understood that the gas to be cleansed is introduced through the inlet h whence it enters the horizontal supply pipe g, and thence passes down through the branch tubes f into the tank a; the gas then passes up through the water. On attaining the upper surface d of the water, the cleansed gas collects within the upper part of the tank and is drawn off through the outlet c to any convenient collector or container not shown in the drawing.

It will be understood that the gas on passing through the water is freed of its contained fume, flue dust or the like, and any such material which may not be separated by the passage through the water is collected at the filtering medium i. The fume or the like so separated is held in suspension in the water and ultimately settles down into the bottom of the tank.

By my method of separating fume and flue dust from gases, I effect a number of advantages in practice. For example, it is found that the gas which issues from the inlet pipes has its fume or dust efficiently extracted, the said fume or dust ultimately settling in the bottom of the tank from which it can be removed as desired by means of a draw-off cock j. Also the submerged filtering medium through which the gas must pass is automatically maintained clean by the washing action of the disturbed water which sweeps off the fume which collects on the said medium and brings it into suspension in the tank so that it ultimately settles in the bottom thereof, for the withdrawal as above described.

My invention is especially applicable to the collection of fume obtained from tin and lead smelting furnaces; the fume from such furnaces usually contains some sulfuric acid which passes into the water in the tank and the temperature of the water is also raised by the hot fume. As a result I have found that the metallic oxid is condensed and collected in the tank in a very efficient manner and any accompanying impurities such as oxids of arsenic, antimony and sulfur are at the same time brought into solution whereby the collected fume is obtained in a pure and cleaned condition.

I claim—

1. An apparatus for collecting fume, flue dust and other matter suspended in gas, comprising a tank or receptacle adapted to contain a body of water, a submerged filtering medium composed of material of fibrous texture, one or more gas inlet tubes extending only a short distance into the tank at the lower part thereof, a gas outlet tube at the upper part of the apparatus, and inlet and outlet water tubes, substantially as hereinbefore described.

2. An apparatus for collecting fume, flue dust and other matter suspended in gas, comprising a tank or receptacle adapted to contain a body of water, a submerged filtering screen of cocoanut fiber or matting, one or more gas inlet tubes extending only a short distance into the tank at the lower part thereof, a gas outlet tube at the upper part of the apparatus, and inlet and outlet water tubes, substantially as hereinbefore described.

RICHARD FRANCIS PEARCE.

Witnesses:
 CHAS. HAMMOND,
 V. H. OSBORN.

---

Copies of this patent may be obtained for five cents each, by addressing the "Commissioner of Patents, Washington, D. C."